United States Patent
Jobst et al.

(10) Patent No.: US 6,707,915 B1
(45) Date of Patent: Mar. 16, 2004

(54) DATA TRANSFER VERIFICATION BASED ON UNIQUE ID CODES

(75) Inventors: Matthias Jobst, Bochum (DE); Erling Bugge Stage, Valby (DK)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/361,410

(22) Filed: Jul. 27, 1999

(30) Foreign Application Priority Data

Jul. 29, 1998 (GB) ............................................. 9816541

(51) Int. Cl.⁷ .............................. H04K 1/00; H04L 9/00
(52) U.S. Cl. ....................... 380/247; 380/270; 380/256; 713/176; 713/184
(58) Field of Search ................................ 713/176, 184; 380/270, 256

(56) References Cited

U.S. PATENT DOCUMENTS

| | | | |
|---|---|---|---|
| 5,077,790 A | * 12/1991 | D'Amico et al. | 380/249 |
| 5,339,361 A | 8/1994 | Schwalm | |
| 5,434,917 A | * 7/1995 | Naccache et al. | 713/176 |
| 5,600,708 A | * 2/1997 | Meche et al. | 455/411 |
| 5,995,624 A | 11/1999 | Fielder et al. | 380/25 |

FOREIGN PATENT DOCUMENTS

| | | | |
|---|---|---|---|
| EP | 447380 A1 | 9/1991 | |
| EP | 0849920 | 6/1998 | ........... H04L/29/06 |
| GB | 2294612 A | 5/1996 | |
| WO | 9531079 | 11/1995 | |

\* cited by examiner

*Primary Examiner*—Thomas R. Peeso
*Assistant Examiner*—Cas Stulberger
(74) *Attorney, Agent, or Firm*—Antonelli, Terry, Stout & Kraus, LLP

(57) ABSTRACT

A method of transferring a data packet from a providing communication terminal to a requesting communication terminal, wherein the requesting communication terminal transfers a message to the providing communication terminal including a requests for receiving the data packet and a first unique identification code identifying the requesting communication terminal. Upon receipt of the message the providing communication terminal verifies the validity of the first unique Identification code. When the verification has been ended successfully, the providing communication terminal responds by transferring a message to the requesting communication terminal including the requested data packet and a second unique identification code, Then the requesting communication terminal verifies the validity of the second unique identification code and stores the data packet accordingly when the verification has been successful.

20 Claims, 5 Drawing Sheets

DATA TRANSFER VERIFICATION BASED ON UNIQUE ID CODES

BACKGROUND OF THE INVENTION

1. Field of the Invention

The invention relates to a new method for transferring a data packet, e.g. a software sequence, between two communication terminals.

2. Description of the Prior Art

Until now communication terminals, such as cellular phones, are loaded with software when leaving the factory. The software is normally flashed into a flash ROM during the assembly of the terminal. A Master Software is copied into the terminal. During the product lifetime the software development continues. This means if minor software improvements are introduced after the launch of the terminal, the Master Software is amended so subsequently manufactured terminals contain copies of the amended version.

When a terminal has been sent for service the entire set of software instructions (the operative system of the terminal) will very often become updated by re-flashing a copy of the Master Software. The User will normally not notice any difference. The loading of software has been performed by inserting a plug into the terminal thus establishing an electronic connection.

However the assignee presented a Smart Messaging concept at the CeBIT fair in 1997. Hereby any GSM phone with the SMS (Short Message Service) capability can access the services. The Smart Messaging technology allows the GSM subscriber access to a wide range of new applications, such as information and "infotainment" services and the Internet. Services could include flight schedules, weather reports, stock news, currency rates, telebanking information, sports news and movie listings. Furthermore the concept may be used for downloading software sold in aftersale. For example, new ringing tones may be downloaded Over The Air (OTA), Communication terminals such as cellular phones have yet to be type approved in order to ensure that the activity of the terminal does not interact with the network or other types of electronic equipment in an unintended or unfavorable manner. Therefore both the manufacturer and the owner of such a communication terminal have a need for securing the terminal against unauthorized software loading into the phone.

SUMMARY OF THE INVENTION

According to one aspect of the present invention there is provided a method of transferring a data packet from a providing communication terminal to a requesting communication terminal, wherein said requesting communication terminal transfers a message to the providing communication terminal including a request for receiving the data packet and a first unique identification code identifying the requesting communication terminal; said providing communication terminal verifies the validity of the first unique identification code, and upon a successful verification, responds by transferring a message to the requesting communication terminal including the requested data packet and a second unique identification code; and said requesting communication terminal verifies the validity of the second unique identification code, and upon a successful verification, stores the data packet accordingly.

Hereby, in embodiments of the invention, the providing communication terminal has an opportunity to verify the identity of the requesting communication terminal before the delivery of the data packet. By controlling the validity of the second unique identification code the requesting communication terminal may verify the identity of the providing communication terminal and thereby check whether the data packet is provided by an authorized provider or not. If the data packet is deemed to be provided by an authorized provider the requesting communication terminal stores the received data packet and if the data packet includes a computer program or parts thereof the terminal automatically runs the required setup routines.

In cellular communication systems the providing communication terminal may advantageously be a fixed unit which is a part of a wireless communication network, while the requesting communication terminal then may be a mobile unit communicating via said wireless communication network.

In a cellular system as for example the GSM network the requesting communication terminal may be a GSM phone and the first unique identification code may include an International Mobile Equipment Identity (IMEI) code. The IMEI code uniquely identifies the phone and includes a Type Approval Code (TAC), a Final Assembly Code (FAC) identifying the assembly plant and a serial number (SN). In total the IMEI code includes 15 digits. In the GSM system its is a part of the standard that the mobile stations (phone) transfer their IMEI code to the network operator in response to a request (RIL3-MM IDENTITY REQUEST message), and these requests are given in order to identify the phone, for example upon location update or in order identify failures in the system.

A Master Password is defined by the administrator of the providing communication terminal. Phones or a communication terminal supporting the data packet verification method according to embodiments of the invention, are each provided with a phone password. The phone password is stored in the phone and is calculated by combining the IMEI number and the Master Password by means of a secure hash algorithm, such as a public key algorithm (for example, the MD5 algorithm from the RSA Data Security Company). The MD5 algorithm is a one-way hash function producing a 128 bit hash value (16 byte) from input messages of arbitrary length.

When the administrator of the providing communication terminal transmits the data packet the phone password calculated based on the Master Password may be used for the calculation of the second unique identification code. This second unique identification code is calculated by combining the code image of the data packet to be sent and the phone password by means of an secure hash algorithm, such as the MD5 algorithm. The code image and the second unique identification code is then transferred to the requesting communication terminal. The requesting communication terminal separates the code image and combines this and the phone password stored in the phone by means of an secure hash algorithm, such as the MD5 algorithm to obtain another signature. Then the requesting communication terminal compares the received second unique identification code and said calculates another signature. When the comparison shows that the codes are identical the requesting communication terminal deems the received code image to authenticated and stores the data accordingly.

Furthermore a successful verification of authentication of the received data packet indicates that the data packet is free from bit errors occurring during the transmission.

According to another aspect of the present invention there is provided a wireless communication network in which a data packet may be transferred securely from a providing communication terminal to a requesting communication terminal, wherein said requesting communication terminal comprises means for transmitting a message to the providing communication terminal, said message includes a request for the data packet and an identification of itself by means of a first unique identification code; said providing communication terminal includes means for verifying the validity of the first unique identification code, and means for transmitting a message, upon a successful verification, to the requesting communication terminal, said message includes the requested data packet and a second unique identification code; said requesting communication terminal comprises means for verifying the validity of the second unique identification code; and the requesting communication terminal includes means for storing the data packet, upon a successful verification of the validity of the received message. This network is able to ensure that unauthorized programs are not downloaded via the network to the communication terminals connected thereto. Otherwise the communication traffic could be affected.

According to a further aspect of the present invention there is provided a computer program product for handling the verification of the transfer of a data packet from a providing communication terminal to a requesting communication terminal, and comprising a computer useable medium in a providing communication terminal having computer readable program code means embodied therein for handling verification of a communication unit requesting a data packet to be transferred over a wireless network from providing communication terminal to the requesting communication unit, the computer readable program code means in the computer program product comprising computer readable program code means for identifying a request for the data packet and a first unique identification code for the mobile unit included in a message received by said providing communication terminal; computer readable program code means for verifying the validity of the first unique identification code; computer readable program code means for setting up a response message to the mobile unit upon a successful verification, said responding message includes the requested data packet and a second unique identification code. This program will normally be running on a computer controlled by a service provider, software provider or the manufacture of the requesting communication units.

Another computer program product according to this further aspect of the invention may run on the requesting communication terminal for handling the verification of the transfer of a data packet from a providing communication terminal to a requesting communication terminal, and comprises a computer useable medium in a mobile unit having computer readable program code means embodied therein for handling a request of a data packet and the verification of the data packet when received via a wireless network from providing communication terminal, the computer readable program code means in the computer program product comprises computer readable program code means for setting up a message to the providing communication terminal, said message includes a request for the data packet and an identification of the mobile unit by means of a first unique identification code; computer readable program code means for identifying the requested data packet and a second unique identification code in the responding message: from the providing communication terminal; computer readable program code means for verifying the validity of the second unique identification code; and computer readable program code means for storing the data packet, upon a successful verification of the validity of the received message.

According to a further aspect of the present invention there is provided a mobile unit for communicating with a providing communication terminal via a wireless communication network, comprises means for transmitting a message to the providing communication terminal, said message includes a request for the data packet and an identification of the mobile unit by means of a first unique identification code; means for receiving a responding message from the providing communication terminal, said responding message includes the requested data packet and a second unique identification code; means for verifying the validity of the second unique identification code; and means for storing the data packet, upon a successful verification of the validity of the received message. Such a mobile unit may be a cellular phone, and the phone will then be able to check whether a software code included in a received data packet may be stored in the phone.

According to a further aspect of the present invention the providing communication terminal is a fixed unit which is a part of a wireless communication network. The fixed part comprises means for receiving a message from a mobile unit, said message includes a request for the data packet and an identification of the mobile unit by means of a first unique identification code; means for verifying the validity of the first unique identification code; and means for transmitting a responding message, upon a successful verification, to the mobile unit, said responding message includes the requested data packet and a second unique identification code. Hereby the software provider will have an opportunity to check whether the requesting phone will be allowed to receive the requested data packet.

In order to secure that only authenticated additional software is downloaded into to a phone. This additional software need to be verified for the following:

1. The software originated from a reputable source and can be expected to be well-behaved.
2. The software is indeed licensed for the particular phone it is downloaded into, so it can be expected to the owner of the software has been duly compensated.

This verification (or digital signature) relies on some secret information being available only to authorized software producers, and the ability to verify knowledge of the secret in the phone.

The binding of software to a particular phone relies on an unalterable ID being available in the phone, and having a mechanism that can prevent software from running if the software is configured for a different ID.

BRIEF DESCRIPTION OF THE DRAWINGS

For a better understanding of the present invention and to understand how the same may be brought into effect reference will now be made by way of example only to the accompanying drawings in which.

DETAILED DESCRIPTION OF THE PREFERRED EMBODIMENTS

Figure 1:
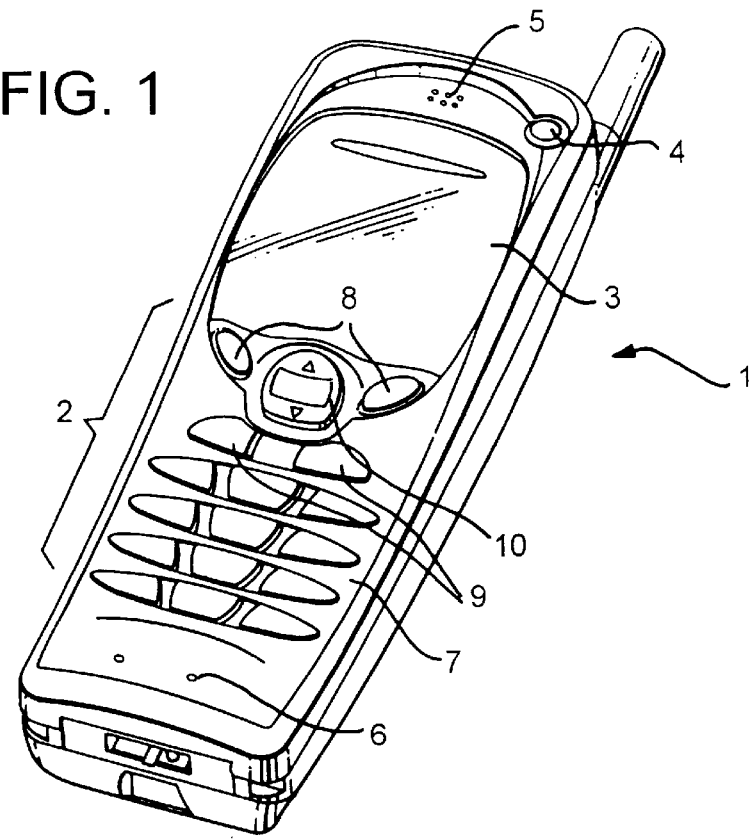
FIG. 1 schematically illustrates a hand portable phone for use in a preferred embodiment of the invention.

Referring to FIG. 1, a phone 1 comprises a user interface having a keypad 2, a display 3, an on/off button 4, a speaker 5, and a microphone 6. The phone 1 according to the preferred embodiment is adapted for communication via a cellular network, but could have been designed for a cordless network as well. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0–9" or a sign "#" or "*", respectively. In alpha mode each key is associated with a number of letters and special signs used in text editing.

The keypad 2 additionally comprises two soft keys 8, two call handling keys 9, and a navigation key 10.

The two soft keys 8 have a functionality corresponding to what is known from the phones Nokia 2110™, Nokia 8110™ and Nokia 3810™ The functionality of the soft key depends on the state of the phone and the navigation in the menu by using a navigation key. The present functionality of the soft keys 8 is shown in separate fields in the display 3 just above the keys 8.

The two call handling keys 9 according to the preferred embodiment are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key with his thumb. This is the best site to place an input key requiring precise motor movements. Many experienced phone users are used to one-hand handling. They place the phone in the hand between the finger tips and the palm of the hand. Hereby the thumb is free for inputting information.

Figure 2:
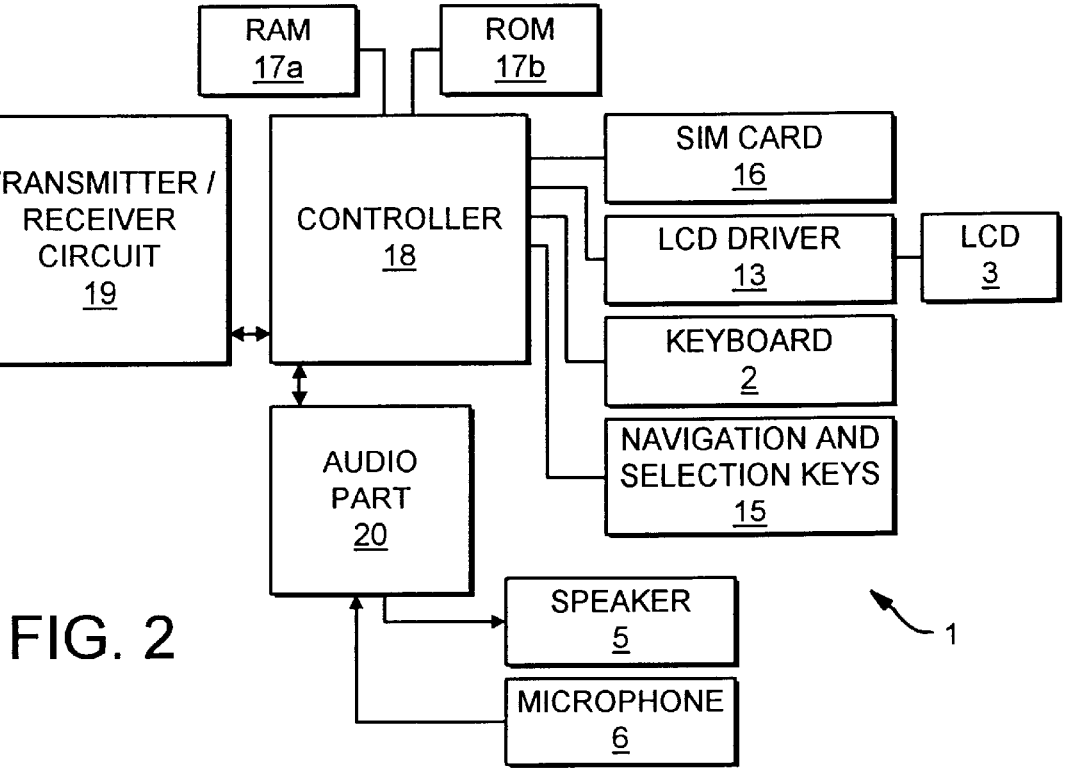
FIG. 2 schematically shows parts of a telephone for communication with a cellular or cordless network.

FIG. 2 schematically illustrates the components of the phone 1. The preferred embodiment of the phone 1 is adapted for use in connection with the GSM network, but, of course, embodiments of the invention find application in connection with other phone networks, such as cellular networks and various forms of, cordless phone systems or in dual band phones accessing sets of these systems/networks. The microphone 6 records the user's speech, and the analog signals formed thereby are A/D converted in an A/D converter (not shown) before the speech is encoded in an audio part 14. The encoded speech signal is transferred to the processor 18, which i.a. supports the GSM terminal software. The processor 18 also forms the interface to the peripheral units of the apparatus, including a RAM memory 17a and a Flash ROM memory 17b, a SIM card 16, the display 3 and the keypad 2 (as well as data, power supply, etc.). The processor 18 communicates with the transmitter/receiver circuit 19. The audio part 14 speech-decodes the signal, which is transferred from the processor 18 to the earpiece 5 via an D/A converter (not shown).

The processor 18 is connected to the user interface. Thus, it is the processor 18 which monitors the activity in the phone and controls the display 3 in response thereto.

Therefore, it is the processor 18 which detects the occurrence of a state change event and changes the state of the phone and thus the display text. A state change event may be caused by the user when activating the keypad including the navigation key 10, and this type of events is called entry events or user events. However, the network communicating with the phone may also cause a state change event. This type of event and other events beyond the user's control are called non user events. Non user events comprise status change during call set-up, change in battery voltage, change in antenna conditions, message on reception of SMS, etc.

The method of transferring a data packet from a providing communication terminal to a requesting communication terminal will be explained in the following with reference to the GSM standard, and especially the use of the data transmission feature available under this standard, The data transmission is handled under Technical Specification; GSM 04.22 issued by ETSI in 1995. The inherent maximum transmission rate in GSM is 9600 bps.

The described method is especially valuable when a phone user requests a new software application to be implemented in for example a cellular phone. When a phone has been type approved the type approval covers the software inherent in the phone. Change of certain parts of the software requires a new type approval of the phone. Neither the manufacturer or the user has an interest in implementing non-verified software in the phone. If the phone affects the network due to erroneous software the phone can be identified and possibly be rejected by the network.

Figure 3:
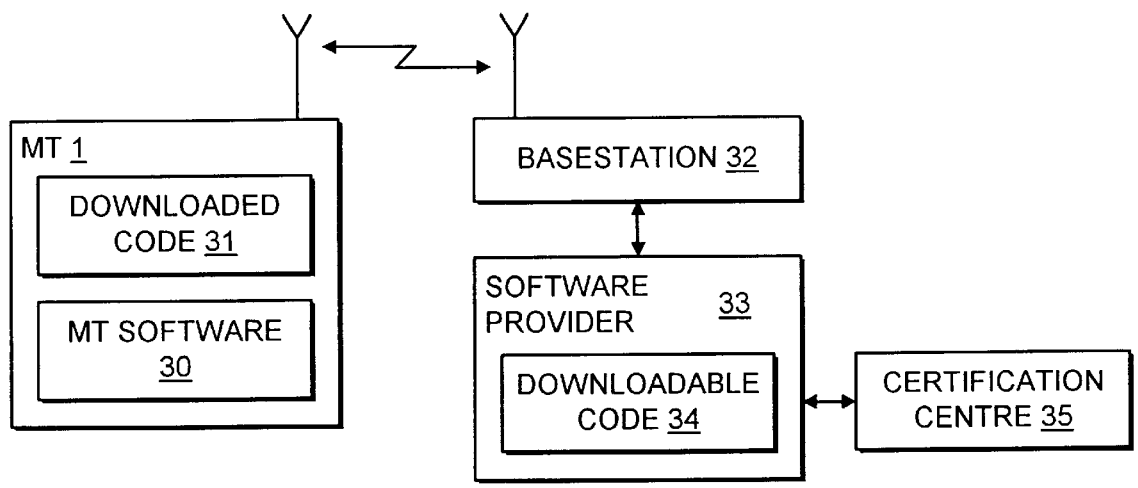
FIG. 3 schematically shows the parts of the network that are involved in the download of codes.

FIG. 3 shows a Mobile Terminal MT such as the phone 1 including MT Software 30 that may include the operating system of the phone 1. The MT Software 30 is in the preferred embodiment stored in an EEPROM which is emulated in the Flash ROM 17b. The MT Software 30 is flashed into the Flash ROM 17b during the manufacturing of the phone 1. The MT Software 30 does furthermore include the so-called IME! code that uniquely identifies the phone 1. The MT Software 30 is saved in an emulated EEPROM space of the Flash ROM 17b, and when a program or a program segment for use with the operating system of the phone has been downloaded over the air this downloaded code 31 is stored temporarily in the RAM memory 17a until the phone has verified the validity of the downloaded code 31. When this has been done the downloaded code 311s transferred to the emulated EEPROM space of the Flash ROM 17b.

A phone may have a dictionary associated with an editor in order to predict a full word based on a few letters inputted by the user. In general such a dictionary requires a memory space in the range 60–100 kByte for each language. A phone for the European market will typically include around ten selectable languages. In order to avoid the storing of up to 1MByte "dead" dictionaries the manufacturer wants to provide the phone with some free memory in which the downloaded code may be stored.

Figure 5:
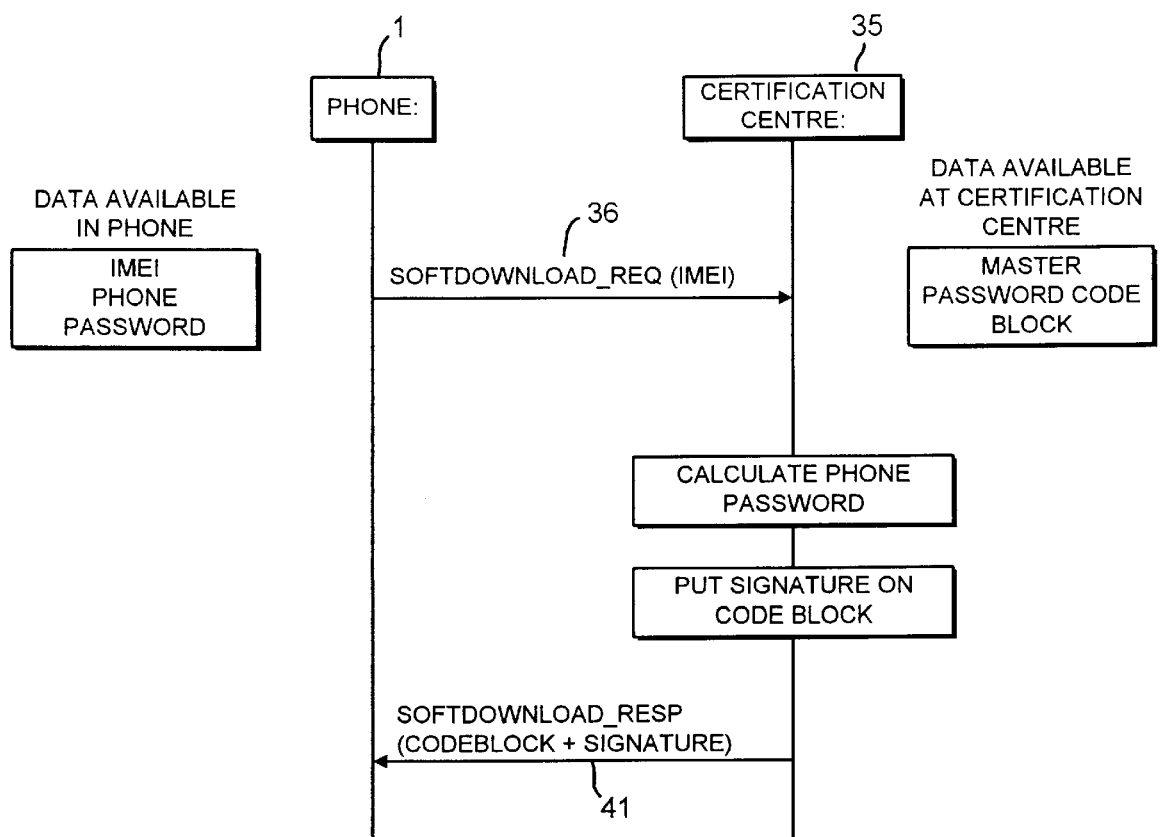
FIG. 5 illustrates the message activity between the phone and the software provider/certification center.

When the user of the phone 1 wants to download an application or a program segment for use in an already available application the user sends a request message 36, "SoftDownload Req(IMEI)" in FIG. 5, identifying the requested software and including the IMEI code of the phone 1. The requesting application of the phone sets up the request message 38 in a predefined format. The request message 36 includes an identification of the receiver (the software provider 33), and this requires an input from the user or from the phonebook of the phone 1. The IMEI code 37 is automatically attached to the request message 36 without being displayed or entered by the user. The requested downloadable code is identified by the user—typically selected as an item in a list earlier received from the software provider.

This request message 36 is forwarded from the phone 1 via the air and a base station 32 in the communication network to a software provider 33 authorized by the manufacturer of the phone 1. The software provider 33 has a set of codes 34 which may be copied or downloaded to a requesting phone 1. These codes 34 include the files requested by the requesting phone 1. Furthermore the software provider 34 has access to a certification center 35 in which authorized IMEI codes, a Master Password and a Code Block is stored.

When the software provider 34 receives a request message 36 the IMEI part of the message is automatically forwarded to certification center 35 that check the validity of the request 36. This is simply done by checking in a database table whether the requesting phone 1 has an open account for paying for the requested software code or file. From this database table the software provider 33 can find the phone number of the requesting phone 1 based on the IMEI code.

If the certification center 35 deems the request message 36 to be valid the certification center 35 then calculates a phone password 40. According to the preferred embodiment the phone password 40 may be calculated by means of a per se known secure hash algorithm, such as MD5 from the RSA Data; Security Company. The MD5 algorithm 39 that is a secure hash algorithm, receives the IMEI code 37 and the Master Password 38 from the memories associated with the certification center 35, and outputs a Phone Password 40 in response.

The Master Password 38 is a universal password defined by the software provider, and the IMEI code 37 is a universal code unambiguously identifying the phone.

When the certification center of the software provider 33 has calculated the phone password 40 it starts calculating a first signature 43 that is unique for this specific software transfer. The calculated Phone Password 40 is put into the beginning and the end of a binary string having the binary code 44 (the code image) of the file to be transferred in the middle. This binary string is inputted into an appropriate signature generating algorithm 42, such as the MD5 algorithm, that was used for calculating the Phone Password 40 as described above. The signature generating algorithm 42 does not need to be similar to the secure hash algorithm 39. The output from the signature generating algorithm 42 may be regarded as a first digital signature 43 (sig2) that is unique for the this specific software transfer, as it is based on a sequence specific for the receiving phone and a sequence specific for the transmitted software code.

When the certification center 35 has calculated the first digital signature 43 (sig2) the service provider 33 starts to transfer the binary code 44 (the code image) of the file and the calculated first digital signature 43 (sig2) to the requesting phone 1. This is indicated in FIG. 5 as a response message 41 (SoftwareDownloadResp(Codeblock+Signature)). The transfer of the response message 41 may be done by using the data transmission facilities set up in, e.g. the GSM standard.

When the phone 1 receives a binary code 47 and the first digital signature 43 (16 bytes) it extracts these two parts from the message based on the informations included in the header of the message 41. Apart from the IMEI code 37 the phone password 45 is stored as a part of the MT software 30 in the phone 1. The phone password 45 is granted by the software provider 33 when an account is established. The phone password 40 calculated by the software provider 33 is identical with the phone password 45 granted to the phone. The two passwords 40 and 45 differ only when errors occur in the calculation at the software provider. The transmitted binary code 44 and the received binary code 47 will be identical when the transmission and the identification in the receiver is free of errors.

Based on the binary code 47 (the code image) and the phone password 45 the phone 1 starts to calculate a second signature 46 (sig2'). The stored Phone Password 45 is put into the beginning and the end of a binary string having the binary code 47 (the code image) of the file received in the middle, For this purpose the binary string is inputted to the very same signature generating algorithm 42 as used by the software provider 33 for calculating the first signature 43 (sig2). When the second signature 46 has been calculated the phone 1 compares this calculated second signature 46 with the first signature 43 received by the response message 41. If these two signatures 43 and 46 fit together that is are identical the phone 1 deems the response message to be coming from an authorized software provider having access to the Master Password 38. Therefor the phone 1 deems the received code image to be authentic and starts to transfer the down loaded code 31 to the MT software. If the authentication has failed the downloaded software would automatically have been deleted.

Further to the verification of the authorization of the received code the described method provides the added benefit that the transmission of the received code has been free of errors. This is due to the fact that the code image is used for the calculation of the signatures (sig2 and sig2') 43 and 46.

When the manufacture of a phone acts as the software provider the phone may be provided by the manufacturer with the phone password during the production. Then a corresponding account may be opened by accessing an appropriate Internet homepage of the manufacturer/software provider. When the user of the phone has placed money into the account or agreed to do so, the user may request new applications or the like to the phone. According to a preferred embodiment these new applications are transferred to the phone as software code for storing in the phone when being recognized as authentic software code.

According to an alternative embodiment of the invention the data packet transferred to the phone does include an instruction that, when authenticated by the phone, activates an application that has been present in the phone as software code since the manufacture of the phone.

A secure hash function produces a fixed-length bit pattern from an input text of any length. Preferably the process should be irreversible or extremely difficult to reverse and the function should give no or extremely little correlation between output results for very similar input texts, that is it should be to all practical intents and purposes computationally infeasible to create a input text, which produces a predefined output from the hash function. The examples show MD5 used as the hash function, but other hash functions may be used in its place.

Provided that a clear text password if known both in the phone and at the authorized software producer, a signature can be constructed. Notice that the password is both prefixed and suffixed the code image. This is done to prevent birthday attacks, that is attacks, where a (untrusted) software supplier generates some software, where the hash value of the code image is the same as an approved version, but the behavior is different (and probably malign).

The downloaded code may be an application to become installed in the phone, for example an application for controlling a television by means of the inherent infra red link of the phone, or an E-mail application setting up an Internet compatible format for the phone, or it may be an activating key opening a, program segment present in the phone but disabled. The downloaded code may therefore be anything from independent executable applications to short code segments used by other applications already available in the phone.

Alternatively the certification center may calculate the phone password when the account is established and store the password in the record that may be addressed by the IMEI code. Then there will be no need for calculating the phone password every time new software is requested.

The authentication process at the providing communication terminal

The providing communication terminal, for example a software provider is authorized by the phone manufacturer and communicating with the network to which the requesting communication unit or phone is connected. The providing communication terminal preferably includes a computer program product on a server for handling the verification of a request for transferring a data packet to a requesting communication terminal or phone.

Figure 6:
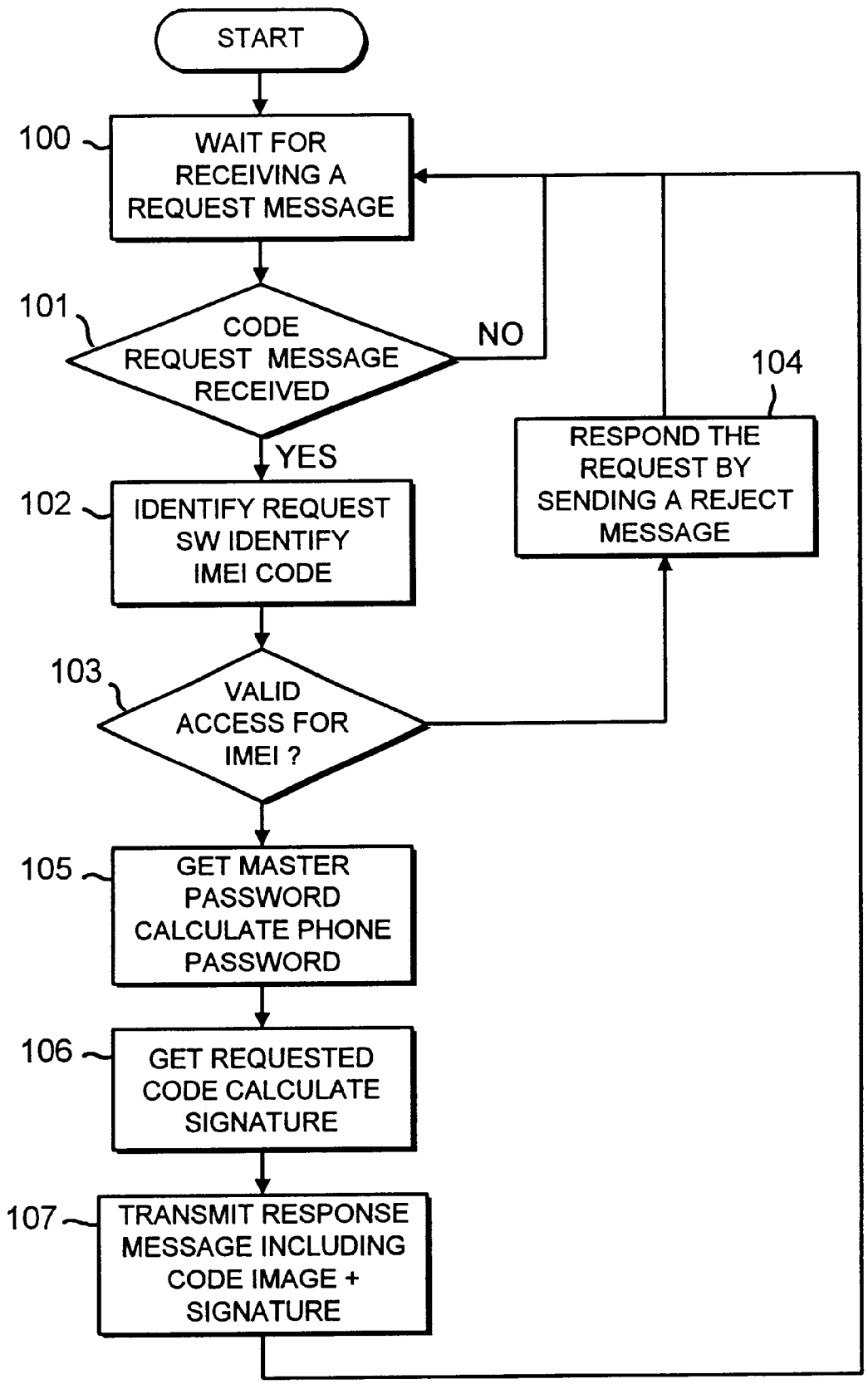
FIG. 6 is a flow chart showing the authentication process at the providing communication terminal.

The providing communication terminal 33 is in a mode 100 in FIG. 6 where it waits for a request message 36. When a request message is received in step 101 the processing unit of the providing communication terminal 33 starts in step 102 to decode the message in order to identify the requested data packet and a first unique identification code for the mobile unit included in the message. This first unique identification code includes according to the preferred embodiment of the invention the IMEI code 37 of the phone.

The providing communication terminal 33 has access to a certification center 35 in which it is checked (step 103) whether the requesting communication terminal or phone do have a valid account for paying the requested program code. If the user does not have a valid account a reject message is sent to the user in step 104 where the user is informed about the situation.

If the requesting communication terminal I has been accepted as a valid user the providing communication terminal 33 starts in step 105 to calculate a phone password 40 for the requesting communication terminal 1 based on the first unique identification code (the International Mobile Equipment Identity (IMEI) code 37) and the master password 38 using a first secure hash algorithm 39, such as MD 5. Then the providing communication terminal 33 provides the requested software code from an appropriate memory connected to the server, Then the providing communication terminal 33 starts to calculate at step 106 a first unique signature 43 based on a binary string having the Phone Password 40 in the beginning and the end and the binary code 44 in the middle by using an appropriate secure hash algorithm 42.

When this is done the providing communication terminal 33 starts to set up a response message 41 to the requesting communication terminal 1, said responding message 41 includes the requested data packet and the first unique signature 43. Then the responding message 41 is transmitted to the requesting communication terminal 1 in step 107. Hereafter the server goes back to step 100 and wait for the next request message. In practice the server preferably has a capacity that is sufficient to serve several requests in parallel.

According to the preferred embodiment according to the invention the computer program is implemented in a service provider server connected to a cellular network for transferring computer software via the wireless network (Over The Air) to mobile units upon request.

The authentication process a the requesting communication terminal

The requesting communication terminal, for example a cellular phone, includes a computer program product for handling the verification of the authenticity of a data packet received from a providing communication terminal upon request. This computer program product is preferably included in the MT Software 30 in FIG. 3 and is an integrated part of a computer application that is controlled by the user and sets up a user interface in which the user may identify the code to be down loaded. Furthermore the computer application may get the IMEI code directly from the MT Software and may get the phone number of the software provider from the phonebook stored on the SIM card once it has been inputted by the user or stored by the phone manufacturer in a memory location in the phone.

The phone 1 has computer readable program code means embodied therein for handling the verification of the data packet when received via a wireless network from the software provider 33. The requesting communication unit or the phone 1 requests a code sequence included in a data packet to be transferred over a wireless network from the software provider 33. The request message 36 has a predefined format set up by the phone 1, and the request message 36 identifies the requested code and the phone 1 requesting the code. The phone 1 is identified by means of a first unique identification code, that preferably is based on the International Mobile Equipment Identity (IMEI) code or a similar type of code that globally identifies the phone.

Figure 7:
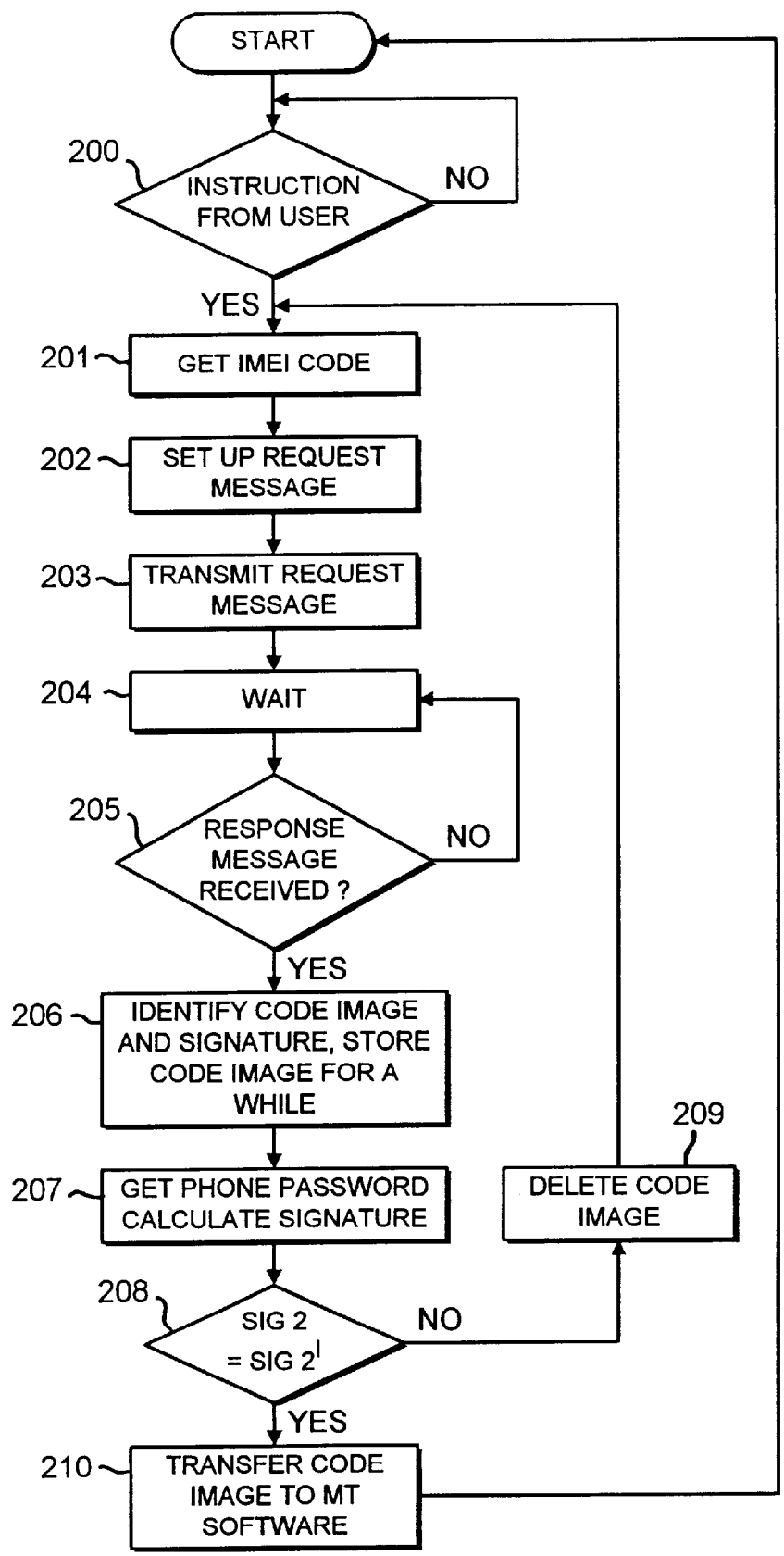
FIG. 7 is a flow chart showing the authentication process at the requesting communication terminal.

As seen from FIG. 7 the software based application in step 200 detects an activity the processor checks whether the user has inputted an instruction. If this is the situation the application gets the IMEI code 37 from the Flash ROM 17b in step 201. In step 202 the application sets up the request message 36 and forwards the message to the software provider 33 in step 283. Then the phone starts to wait (step 204) for the response message. When a message is received it is checked in step 205 whether the message is the response message the phone 1 is waiting for.

When the phone 1 detects the response message 41 it starts in step 206 to identify the code image 47 or the requested data packet and the first signature 43 or the second unique identification code. When the first signature 43 is identified the phone starts to verify the validity of the first signature 43 and thereby the authenticity of the received response message 41.

The verification of the validity of the first signature 43 includes calculation of a second signature 46. This second signature 46 is calculated by phone 1 by inputting a phone password 45 stored in the phone into the beginning and the end of a binary string having the received binary code 47 in the middle into a secure hash algorithm 42 (MD5) that is identical to the secure hash algorithm 42 (MD5) used by the certification center for calculating the first signature 43.

The two signatures 43 and 46 are calculated base on the very same secure hash algorithm 42 (MD5). By comparing these two signatures 43 and 46 the phone 1 can prove the validity of the received message 41. If the received code image 47 fully corresponds the transmitted code image 44 the two signatures 43 and 46 will be identical. The phone 1 calculates the second signature 46 based on the code image 47 and the phone password 45. The phone password 45 is not transmitted over the air and is only available in the phone and in the computer of the software provider 33. The software provider 33 calculates the first signature 46 based on the code image 44, the IMEI code 37 and master password 38. The IMEI code 37 is transmitted via the network and may be intercepted by an unauthorized third party. However the master password is only present in the computer of the software provider 33. Therefore the phone may be in a situation where it may deem a message to be authorized when sender of the message is able to provide a correct first signature 43. Therefore the phone 1 in step 208 compares the two signatures 43 and 46 and stores in step 210 the received code image 47 in the MT software area 30 when the two signature are identical. Hereby the received software image is added to the existing MT software as a new application or a new software segment for use in an existing application.

Otherwise the phone skips the received software (code image 47) and asks for a re-transmission in step 209. When the two signatures 43 and 46 are different this may be caused by errors in the transmission. Then steps 201–208 are repeated. If the re-transmission is also unsuccessful the phone may automatically inform the service provider about the situation and desist from further attempts.

Explanation of an alternative embodiment

Figure 8:
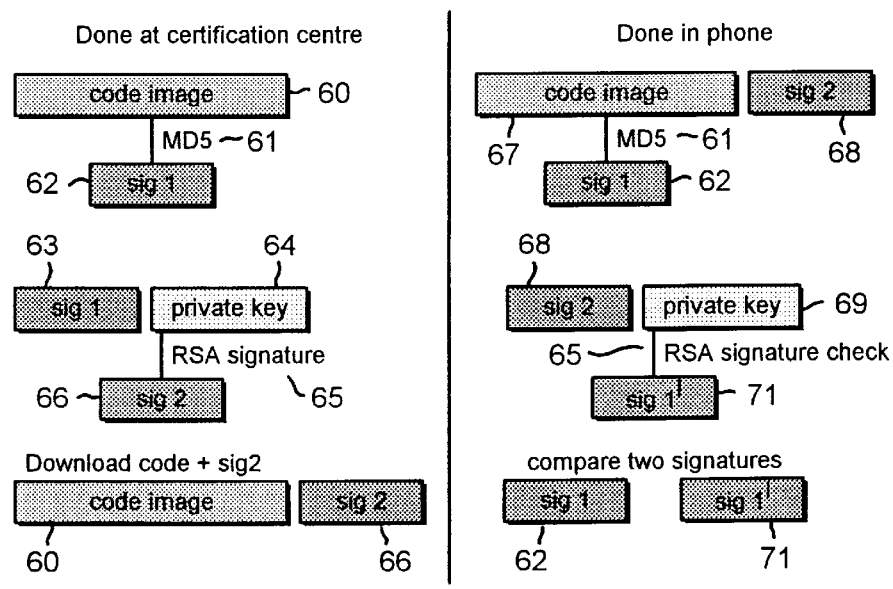
FIG. 8 illustrates the calculations performed in an alternative embodiment based on an encryption algorithm.

Another technique for verifying downloaded code involves using public key encryption. Such a technique will be briefly described with reference to FIG. 8. With public key encryption it is not necessary to keep the password in clear text format in the phone to verify downloaded code. Instead a public key is kept in the phone. This public key 69 corresponds to a private key 64 which is only known at the software certification center.

Figure 4:
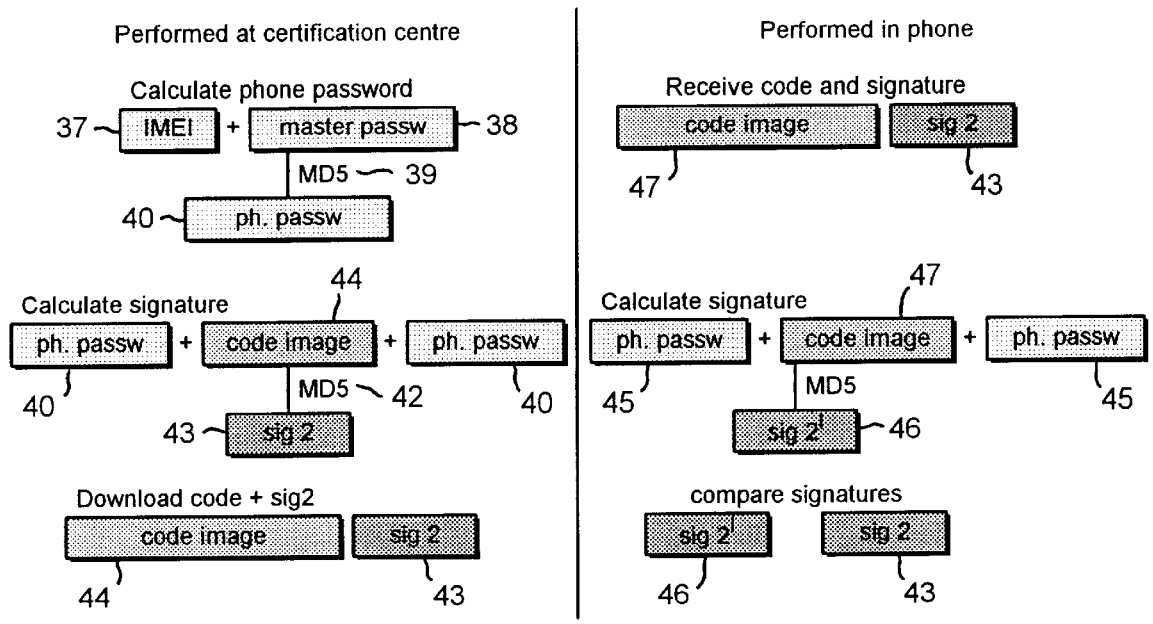
FIG. 4 illustrates the calculations performed in the preferred embodiment based on a secure hash algorithm.

When a request has been received at the software provider 33 and the requesting terminal has been validated in a similar way as described with reference to FIGS. 3–5 the software provider 33 starts to set up signatures for use in the transfer of the software block. At the software verification center 35 a hash value or signature (sig1) 62 for a download software block 60 is calculated by means of an appropriate hash algorithm 61, for example MD5. This signature 62 is then encrypted using the private key 64 by using an appropriate encryption algorithm 65, e.g. an RSA algorithm, and the resulting digital signature 66 is appended to the software block 60 and down loaded to the requesting terminal.

When the requesting terminal (the phone 1) receives a software block 67, it can calculate the hash value or signature (sig1) 62 for the software block 67 by means of the same hash algorithm 61 as used in the certification center, for example MD5. The appended signature 68 shall not be used in these calculations.

The appended signature 68 is decrypted using the public key 69, which is kept in the phone. The same encryption algorithm 65, for example an RSA algorithm as used in the certification center 35 is used in the phone for calculating a signature (sig1') 71. If the calculated hash value (sig1) 62 matches the decrypted signature (sig1') 71, the software block 67 is verified. The software blocks 60 and 67 will be identical when the transmission was free of errors. The signatures (sig2) 66 and 68 are also be identical under these circumstances.

It is not necessary to hide the public key or the code doing the check, as the algorithms are strong enough themselves. But it is desirable to ensure that the checking cannot be disabled, for example by patching the validation code itself.

The phone password does not need to be available at the software provider 33 it can also be only known at the certification center 35 and the phone. Because even the calculation of the signature can be done at the certification center. This way even the phone passwords are protected against fraud at the software provider's site.

The smart messaging concept demonstrated by the applicant at the Asia Telecom 97 fair in Singapore June 1997 may be use for setting the format of the messages.

What is claimed is:

1. A method of transferring a data packet from a providing communication terminal to a requesting communication terminal, wherein:

the requesting communication terminal transfers a message to the providing communication terminal including a request for receiving the data packet and a first unique identification code identifying the requesting communication terminal;

the providing communication terminal verifies the validity of the first unique identification code, and upon a successful verification, responds by transferring a message to the requesting communication terminal including the requested data packet and a second unique identification code; and the requesting communication terminal verifies the validity of the second unique identification code, and upon a successful verification, stores the data packet accordingly; and wherein the providing communication terminal is a fixed unit which is a part of a wireless communication network, and the requesting communication terminal is a mobile unit communicating via the wireless communication network;

the first unique identification code includes an International Mobile Equipment Identity (IMEI) code that is unique for the mobile unit;

the mobile unit further to the unique identification code is associated with a unique password which is stored in the mobile unit and which may be calculated by the providing communication terminal based on the International Mobile Equipment Identity ((MEI) code and a master password that is available for the providing communication terminal, and the providing communication terminal calculates a first unique signature based on the master password and the received International Mobile Equipment identity (IMEI) code, and the first unique signature is used as the second unique identification code; and the providing communication terminal calculates a phone password for the mobile unit based on the International Mobile Equipment Identity (IMEI) code and the master password uses a secure hash algorithm, and then calculates the first unique signature based on the phone password and the data packet to be sent using the same secure hash algorithm.

2. A method according to claim 1, wherein the mobile unit upon receipt of the message including the requested data packet and the unique signature calculates a second signature based on the data packet received and the phone password by using an secure hash algorithm complementary to the secure hash algorithm used in the providing communication terminal, and the mobile unit compares the first unique signature received as a part of the message and the calculated second signature, and deems the message including the data packet to be verified when the two signatures fit together.

3. A method of transferring a data packet from a providing communication terminal to a requesting communication terminal, wherein:

the requesting communication terminal transfers a message to the providing communication terminal including a request for receiving the data packet and a first unique identification code identifying the requesting communication terminal;

the providing communication terminal verifies the validity of the first unique identification code, and upon a successful verification, responds by transferring a message to the requesting communication terminal including the requested data packet and a second unique identification code; and the requesting communication terminal verifies the validity of the second unique identification code, and upon a successful verification, stores the data packet accordingly; and wherein the providing communication terminal calculates a session specific value based on inputting the requested data packet into a secure hash algorithm, and calculates the second unique identification code by means of a private key and the session specific value to an encryption algorithm; and the requesting communication terminal verifies the validity of the second unique identification code by calculating a session specific value based on inputting the received data packet into a secure hash algorithm similar to the hash algorithm used by the providing communication terminal, and calculates a signature by means of inputting a public key and the received second unique identification code into a decryption algorithm similar to the encryption algorithm used by the providing communication terminal, and verifies the validity of the second unique identification code when the session specific value based on inputting the received data packet and signature calculated by means of the public key and the received second unique identification code fit together.

4. A wireless communication network in which a data packet may be transferred securely from a providing communication terminal to a requesting communication terminal, wherein:

the requesting communication terminal comprises means for transmitting a message to the providing communication terminal, the message includes a request for the data packet and an identification of itself by means of a first unique identification code;

the providing communication terminal includes means for verifying the validity of the first unique identification code, and means for transmitting a message, upon a successful verification, to the requesting communication terminal, the message includes the requested data packet and a second unique identification code;

the requesting communication terminal comprises means for verifying the validity of the second unique identification code; and the requesting communication terminal includes means for storing the data packet, upon a successful verification of the validity of the received message; and wherein the providing communication terminal is a fixed unit which is a part of a wireless communication network, and the requesting communication terminal, is a mobile unit communicating via said wireless communication network;

the first unique identification code includes an International Mobile Equipment Identity (IMEI) code that is unique for the mobile unit;

the mobile unit further to the unique identification code is associated with a unique password which is stored in the mobile unit, the providing communication terminal comprises means for calculating a first unique signature based on the International Mobile Equipment Identity (IMEI) code and a master password that is available for the providing communication terminal, the first unique signature is used as the second unique identification code;

means for calculating a phone password for the mobile unit based on the International Mobile Equipment Identity (IMEI) code and the master password using an secure hash algorithm; and means for calculating the first unique signature based on the phone password and the data packet to be send using the same secure hash algorithm.

5. A wireless communication network according to claim 4, wherein the mobile unit comprises means for calculating a second signature based on the data packet received and the phone password by using an secure hash algorithm complementary to the secure hash algorithm used in the providing communication terminal.

6. A wireless communication network in which a data packet may be transferred securely from a providing communication terminal to a requesting communication terminal, wherein:

the requesting communication terminal comprises means for transmitting a message to the providing communication terminal, the message includes a request for the data packet and an identification of itself by means of a first unique identification code;

the providing communication terminal includes means for verifying the validity of the first unique identification code, and means for transmitting a message, upon a successful verification, to the requesting communication terminal, the message includes the requested data packet and a second unique identification code;

the requesting communication terminal comprises means for verifying the validity of the second unique identification code; and the requesting communication terminal includes means for storing,the data packet, upon a successful verification of the validity of the received message; and wherein the calculation means in the providing communication terminal are prepared for calculating a session specific value based on inputting the requested data packet into a secure hash algorithm, and calculating the second unique identification code by means of a private key and the session specific value to an encryption algorithm, and wherein the calculation means in the communication terminal are prepared for the verifying the validity of the second unique identification code by calculating a session specific value based on inputting the received data packet into a secure hash algorithm similar to the hash algorithm used by the providing communication terminal; and calculating a signature by means of inputting a public key and the received second unique identification code into a decryption algorithm similar to the encryption algorithm used by the providing communication terminal, and verifying the validity of the second unique identification code when the session specific value based on inputting the received data packet and signature calculated by means of the public key and the received second unique identification code fit together.

7. A computer program product for handling the verification of the transfer of a data packet from a providing communication terminal to a requesting communication terminal, comprising:

a computer useable medium in a providing communication terminal having computer readable program code means embodied therein for handling verification of a communication unit requesting a data packet to be transferred over a wireless network from providing communication terminal to the requesting communication unit, the computer readable program code means in the computer program product comprising computer readable program code means for identifying a request for the data packet and a first unique identification code for the mobile unit included in a message received by the providing communication terminal, computer readable program code means for verifying the validity of the first unique identification code, computer readable program code means for setting up a response message to the mobile unit upon a successful verification, the responding message includes the requested data packet and a second unique identification code, computer readable program code means for calculating a phone password for the mobile unit based on the first unique identification code (the International Mobile Equipment Identity (IMEI) code) and the master password using a first secure hash algorithm, and computer readable program code means for calculating the first unique signature based on the phone password and the data packet to be sent using a second secure hash algorithm.

8. A computer program product for handling the verification of the transfer of a data packet from a providing communication terminal to a requesting communication terminal, comprising:

a computer useable medium in a providing communication terminal having computer readable program code means embodied therein for handling verification of a communication unit requesting a data packet to be transferred over a wireless network from providing communication terminal to the requesting communication unit, the computer readable program code means in the computer program product comprising computer readable program code means for identifying a request for the data packet and a first unique identification code for the mobile unit included in a message received by the providing communication terminal, computer readable program code means for verifying the validity of the first unique identification code, computer readable program code means for setting up a response message to the mobile unit upon a successful verification, the responding message includes the requested data packet and a second unique identification code; and wherein the computer readable program code means for calculating the first unique signature are prepared for calculating a session specific value based on inputting the requested data packet into a secure hash algorithm; and the second unique identification code is calculated by means of a private key and said session specific value to an encryption algorithm.

9. A computer program product according to claim 8, implemented in a service provider computer connected to a cellular network for transferring computer software via the wireless network (Over The Air) to mobile units upon request.

10. A computer program product for handling the verification of the transfer of a data packet from a providing communication terminal to a requesting communication terminal, comprising:

a computer useable medium in a mobile unit having computer readable program code means embodied therein for handling a request of a data packet and the verification of the data packet when received via a wireless network from providing communication terminal, the computer readable program code means in the computer program product comprising computer readable program code means for setting up a message to the providing communication terminal, the message includes a request for the data packet and an identification of the mobile unit by means of a first unique identification code, computer readable program code means for identifying the requested data packet and a second unique identification code in the responding message from the providing communication terminal, computer readable program code means for verifying the validity of the second unique identification code, and computer readable program code means for storing the data packet, upon a successful verification of the validity of the received message, and comprises computer readable program code means for calculating a second signature based on the data packet received and the phone password by using an secure hash algorithm complementary to the secure hash algorithm used in the providing communication terminal, and computer readable program code means for comparing the second unique identification code received as a part of the message and the calculated second signature, and for deeming the message including the data packet to be verified when the two signatures fits together.

11. A computer program product according to claim 10, wherein:

computer readable program code means uses an International Mobile Equipment Identity (IME!) code as first unique identification code that is unique for the mobile unit, and comprises computer readable program code means for calculating a second signature based on the data packet received and the phone password by using an secure hash algorithm complementary to the secure hash algorithm used in the providing communication terminal, and computer readable program code means for comparing the second unique identification code received as a part of the message and the calculated second signature, and for deeming the message including the data packet to be verified when the two signatures fits together.

12. A computer program product for handling the verification of the transfer of a data packet from a providing communication terminal to a requesting communication terminal, comprising:

a computer useable medium in a mobile unit having computer readable program code means embodied therein for handling a request of a data packet and the verification of the data packet when received via a wireless network from providing communication terminal, the computer readable program code means in the computer program product comprising computer readable program code means for setting up a message to the providing communication terminal, the message includes a request for the data packet and an identification of the mobile unit by means of a first unique identification code, computer readable program code means for identifying the requested data packet and a second unique identification code in the responding message from the providing communication terminal, computer readable program code means for verifying the validity: of the second unique identification code, and computer readable program code means for storing the data packet, upon a successful verification of the validity of the received message; and wherein the computer readable program code means for calculating the first unique signature are prepared for the verifying the validity of the second unique identification code by calculating a session specific value based on inputting the received data packet into a secure hash algorithm similar to the hash algorithm used by the providing communication terminal, and calculating a signature by means of inputting a public key and the received second unique identification code into a decryption algorithm similar to the encryption algorithm used by the providing communication terminal, and verifying the validity of the second unique identification code when the session specific value based on inputting the received data packet and signature calculated by means of the pubic key and the received second unique identification code fit together.

13. A mobile unit for communicating with a providing communication terminal via a wireless communication network, comprising:

means for transmitting a message to the providing communication terminal, the message includes a request for the data packet and an identification of the mobile unit by means of a first unique identification code;

means for receiving a responding message from the providing communication terminal, the responding message includes the requested data packet and a second unique identification code;

means for verifying the validity of the second unique identification code; and means for storing the data packet, upon a successful verification of the validity of the received message; and wherein the mobile unit, when receiving the message including the second unique identification code from the providing communication terminal, handles the second unique identification code as a first unique signature;

the mobile unit furthermore comprises means for calculating a second signature based on the data packet received and the phone password by using an secure hash algorithm complementary to the secure hash algorithm used in the providing communication terminal, and means for comparing the first unique signature received as a part of the message and the calculated second signature, and for deeming the message including the data packet to be verified when the two signatures fits together.

14. A mobile unit according to claim 13, wherein:

the first unique identification code includes an international Mobile Equipment Identity (IMEI) code that is unique for the mobile unit.

15. A mobile unit according to claim 14, wherein:

the mobile unit further to the unique identification code is associated with a unique password which is stored in the mobile unit and which may be derived from a master password when the International Mobile Equipment Identity (IMEI) code is known.

16. A mobile unit according to claim 13, wherein:

the mobile unit is a cellular telephone.

17. A mobile unit for communicating with a providing communication terminal via a wireless communication network, comprising:

means for transmitting a message to the providing communication terminal, the message includes a request for the data packet and an identification of the mobile unit by means of a first unique identification code;

means for receiving a responding message from the providing communication terminal, the responding message includes the requested data packet and a second unique identification code;

means for verifying the validity of the second unique identification code; and means for storing the data packet, upon a successful verification of the validity of the received message; and wherein the calculation means in the providing communication terminal are prepared for calculating a session specific value based on inputting the requested data packet into a secure hash algorithm, and calculating the second unique identification code by means of a private key and the session specific value to an encryption algorithm, and wherein the calculation means in the requesting communication terminal are prepared for the verifying the validity of the second unique identification code by calculating a session specific value based on inputting the received data packet into a secure hash algorithm similar to the hash algorithm used by the providing communication terminal, and calculating a signature by means of inputting a public key and the received second unique identification code into a decryption algorithm similar to the encryption algorithm used by the providing communication terminal, and verifying the validity of the second unique identification code when the session specific value based on inputting the received data packet and signature calculated by means of the public key and the received second unique identification code fit together.

18. A providing communication terminal is a fixed unit which is a part of a wireless communication network, and comprising:

means for receiving a message from a mobile unit, said message includes a request for the data packet and an identification of the mobile unit by means of a first unique identification code;

means for verifying the validity of the first unique identification code; and means for transmitting a responding message, upon a successful verification, to the mobile unit, said responding message includes the requested data packet and a second unique identification code; and means for calculating a phone password for the mobile unit based on the first unique identification code (the International Mobile Equipment Identity (IMEI) code) and the master password using an secure hash algorithm, and means for calculating said first unique signature based on the phone password and the data packet to be sent using the same secure hash algorithm.

19. A providing communication terminal according to claim 18, provided as a fixed unit which is a part of a wireless communication network.

20. A providing communication terminal is a fixed unit which is a part of a wireless communication network, and comprising:

means for receiving a message from a mobile unit, said message includes a request for the data packet and an identification of the mobile unit by means of a first unique identification code; and means for verifying the validity of the first unique identification code; and means for transmitting a responding message, upon a successful verification, to the mobile unit, said responding message includes the requested data packet and a second unique identification code; and wherein the calculation means in the providing communication terminal are prepared for calculating a session specific value based on inputting the requested data packet into a secure hash algorithm; and calculating the second unique identification code by means of a private key and said session specific value to an encryption algorithm.

* * * * *